(12) United States Patent
Ritter

(10) Patent No.: US 6,753,875 B2
(45) Date of Patent: Jun. 22, 2004

(54) SYSTEM AND METHOD FOR RENDERING A TEXTURE MAP UTILIZING AN ILLUMINATION MODULATION VALUE

(75) Inventor: Bradford A. Ritter, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 09/921,477

(22) Filed: Aug. 3, 2001

(65) Prior Publication Data

US 2003/0025706 A1 Feb. 6, 2003

(51) Int. Cl.$^7$ .......................... G09G 5/00; G06T 15/50
(52) U.S. Cl. .............................. 345/582; 345/426
(58) Field of Search ............................... 345/426, 581, 345/582, 583, 584–588

(56) References Cited

U.S. PATENT DOCUMENTS

| | | | | |
|---|---|---|---|---|
| 6,163,319 A | * | 12/2000 | Peercy et al. ............... | 345/426 |
| 6,330,000 B1 | * | 12/2001 | Fenney et al. .............. | 345/586 |
| 6,333,742 B1 | * | 12/2001 | Morioka et al. ............ | 345/426 |
| 6,356,265 B1 | * | 3/2002 | Knittel et al. ............... | 345/426 |
| 6,515,674 B1 | * | 2/2003 | Gelb et al. .................. | 345/582 |
| 6,525,731 B1 | * | 2/2003 | Suits et al. .................. | 345/427 |
| 6,567,083 B1 | * | 5/2003 | Baum et al. ................. | 345/426 |
| 6,583,790 B1 | * | 6/2003 | Wolters ....................... | 345/584 |
| 6,639,595 B1 | * | 10/2003 | Drebin et al. ............... | 345/426 |
| 6,664,962 B1 | * | 12/2003 | Komsthoeft et al. ........ | 345/426 |
| 2002/0080136 A1 | * | 6/2002 | Kouadio ...................... | 345/426 |

OTHER PUBLICATIONS

Ser. No. 09/528,700, entitled Apparatus for and Method of Rendering 3D Objects with Parametric Texture Maps.
Ser. No. 09/921,476 entitled System and Method for Synthesis of Parametric Texture Map Textures, filed Aug. 3, 2001.

* cited by examiner

Primary Examiner—Michael Razavi
Assistant Examiner—Ryan Yang

(57) ABSTRACT

In one embodiment, the present invention is directed to a system for rendering a pixel of a digital image. The system may comprise a texture map data structure representing a texture map of a plurality of texels; the texture map structure comprising a plurality of coefficients for each texel of the texture map; the plurality of coefficients defining lighting characteristics of the respective texel in response to illumination in a plane. The system may further comprise a modulation data structure; the modulation data structure defining a range of values associated with an illumination vector. Additionally, the system may comprise a rendering algorithm; the rendering algorithm operable to calculate a texel display value using the texture map data structure; the rendering algorithm operable to determine an illumination modulation value from the modulation data structure; and the rendering algorithm being operable to multiply the texel display value by the illumination modulation value to render a pixel.

20 Claims, 4 Drawing Sheets

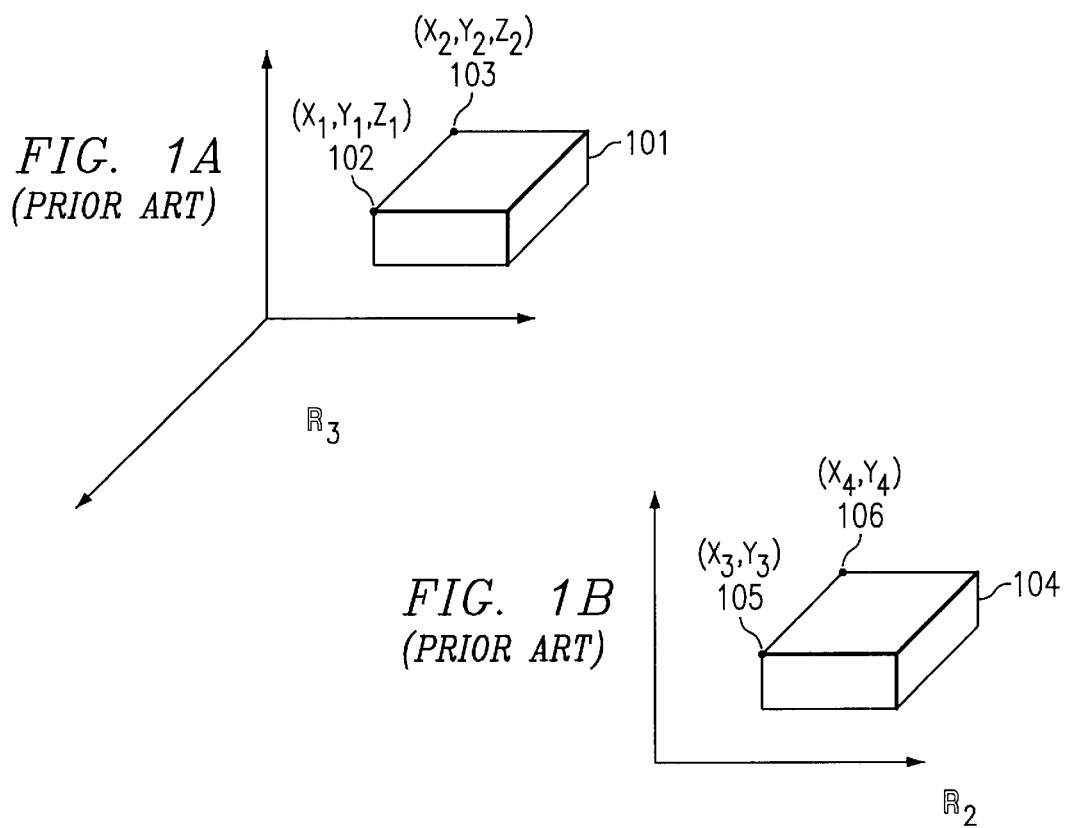
FIG. 1A (PRIOR ART)
FIG. 1B (PRIOR ART)
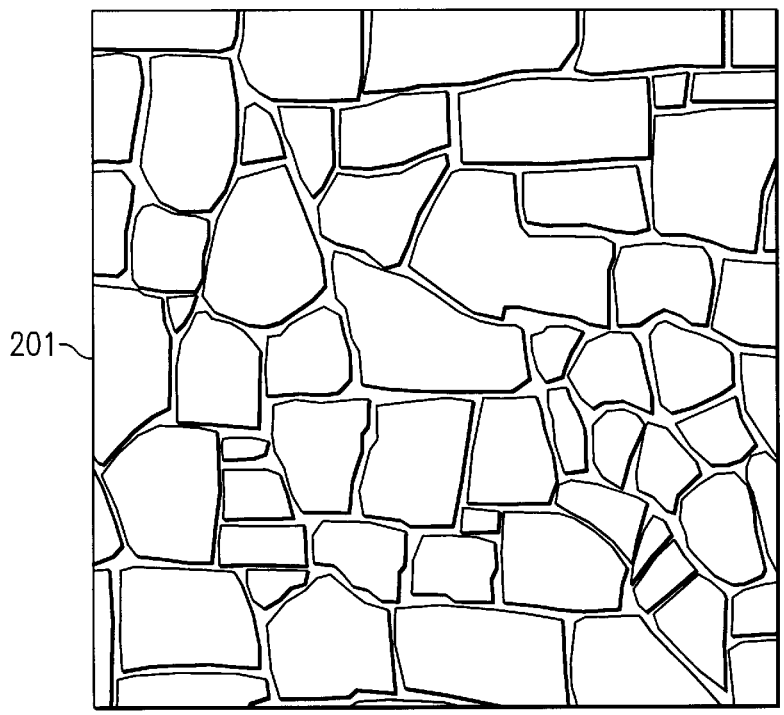
FIG. 2 (PRIOR ART)

SYSTEM AND METHOD FOR RENDERING A TEXTURE MAP UTILIZING AN ILLUMINATION MODULATION VALUE

CROSS-REFERENCE TO RELATED APPLICATIONS

The present invention is related to co-pending and commonly assigned U.S. patent application Ser. No. 09/528,700 (filed Mar. 17, 2000, now issued as U.S. Pat. No. 6,583,790) entitled "APPARATUS FOR AND METHOD OF RENDERING 3D OBJECTS WITH PARAMETRIC TEXTURE MAPS," and co-pending and commonly assigned U.S. patent application Ser. No. 09/921,476, filed Aug. 3, 2001, entitled "SYSTEM AND METHOD FOR SYNTHESIS OF PARAMETRIC TEXTURE MAP TEXTURES," which are incorporated herein by reference.

BACKGROUND OF THE INVENTION

1. Technical Field

The present invention is related to computer graphics processing and more particularly to a system and method for rendering a texture map utilizing an illumination modulation value.

2. Background

Various techniques have been utilized to render graphical images via computer systems. One technique that has received appreciable attention is texture mapping. A texture refers to a graphics data structure which models the surface appearance of an object. A texture may represent the visual experience of many materials and substances (e.g., terrain, plants, minerals, fur, and skin). Textures may be created digitally by sampling a physical surface utilizing photographic techniques. Alternatively, textures may be created manually utilizing a suitable graphics design application. Texture mapping involves mapping the surface appearance to a graphical surface modeled by a three-dimensional structure.

Texture mapping may be utilized for any number of applications. For example, texture mapping may be utilized by an architectural software application to generate a realistic depiction of a building based upon blueprint designs. For example, a stucco texture may be wrapped onto a building frame by the architectural software application. Texture mapping may be additionally used to create special effects for movies, video game animation, website wallpapers, and/or the like. Texture mapping is desirable for these applications, because it facilitates the representation of an object with an appreciable amount of realism and detail. Moreover, texture mapping imparts three-dimensional qualities to the computer generated image.

Texture mapping algorithms involve wrapping a texture over the surface of a model. Specifically, a three-dimensional model or data structure of an object is created. For example, FIG. 1A depicts exemplary object 101 in three-dimensional real space ($R_3$). The surface of object 101 may be represented as a set of polygons (typically triangles) in three-dimensional space. The polygons are represented by their various vertexes. The vertexes are defined by coordinates in three-dimensional real space ($R_3$). For example, vertex 102 is defined by ($x_1$, $y_1$, $z_1$) and vertex 103 is defined by ($x_2$, $y_2$, $z_2$)

However, most computer displays are only capable of displaying graphical images in two dimensions. Accordingly, a mapping function is utilized to map the coordinates in three-dimensional real space ($R_3$) to coordinates in two-dimensional real space ($R_2$). Typically, the mapping occurs by defining a view angle. FIG. 1B depicts such a mapping from object 101 of FIG. 1A to object 104. Vertex 102 is mapped to vertex 105 where vertex 105 is defined by two coordinates ($x_3$, $y_3$). Likewise, vertex 103 is mapped to vertex 106 where vertex 106 is defined by two coordinates ($x_4$, $y_4$). The mapping function allows the data to be represented in a form that may be displayed by a computer display.

Concurrently with the mapping, a texture is applied within the confines of the polygons of object 104 to provide a realistic appearance. For example, texture 201 of FIG. 2 may be applied to the polygons of object 104 to create a stone-like appearance. Texture 201 is typically implemented as a matrix of red, green, and blue (RGB) values. The RGB values are mapped utilizing a suitable mapping function to the interior of the polygons of object 104. The final graphical image appears to have texture 201 "wrapped" around object 104.

However, this approach is limited as the final graphical image, to an extent, appears flat. Specifically, the graphical image does not appreciably vary in response to a change in illumination direction. Since it does not appreciably change under these conditions, localized shading or occlusions are not evident. Moreover, interreflections due to surface irregularities are not perceived.

Bump mapping is a technique to address these limitations. Bump mapping involves creating a bump map of displacement values. The displacement values are utilized to perturb the surface normal vector. The perturbed surface normal vector is utilized to rendering shading in accordance with the Blinn/Phong lighting equation. Although bump mapping techniques do provide optical effects that are not present in RGB texture mapping techniques, the degree of realism produced by bump maps is limited. Moreover, bump mapping is problematic, because the creation of the displacement values may, particularly from actual samples, be cumbersome.

BRIEF SUMMARY OF THE INVENTION

In one embodiment, the present invention is directed to a system for rendering a pixel of a digital image. The system may comprise a texture map data structure representing a texture map of a plurality of texels; the texture map structure comprising a plurality of coefficients for each texel of the texture map; the plurality of coefficients defining lighting characteristics of the respective texel in response to illumination in a plane. The system may further comprise a modulation data structure; the modulation data structure defining a range of values associated with an illumination vector. Additionally, the system may comprise a rendering algorithm; the rendering algorithm operable to calculate a texel display value using the texture map data structure; the rendering algorithm operable to determine an illumination modulation value from the modulation data structure; and the rendering algorithm being operable to multiply the texel display value by the illumination modulation value to render a pixel.

BRIEF DESCRIPTION OF THE DRAWINGS

FIG. 1A depicts an exemplary object in $R_3$ according to the prior art.

FIG. 1B depicts an exemplary mapping of polygons into $R_2$ based on the object depicted in FIG. 1 according to the prior art.

FIG. 2 depicts an exemplary texture according to the prior art.

DETAILED DESCRIPTION OF THE INVENTION

Embodiments of the present invention are related to a system and method for enhancing an image produced by parametric texture mapping (PTM). PTM is a computer algorithm for rendering objects using a two-dimensional representation of light. PTM is desirable because it produces quite realistic images based on material properties while possessing reasonable computational complexity. Additionally, it shall be appreciated that the PTM algorithm does not require complex geometric modeling. Instead, optical properties are encoded directly into the texture itself. By placing illumination-dependent information into the texture, PTM algorithms are capable of producing enhanced optical effects while reducing computational complexity.

In PTM, each texel of the texture contains lighting information. The lighting information is used to reconstruct the surface color under varying light conditions. PTM textures permit perception of surface deformations. Additionally, PTM textures permit perception of self-shadowing and interreflections. PTM textures may also simulate other optical effects such as anisotropic and Frensel shading models.

In PTM, each texel is defined by a biquadric function with six coefficients. Each texel is represented by the following form:

$$PTM(u,v) = Au^2 + Bv^2 + Cuv + Du + Ev + F,$$

where u and v represent scalar quantities associated with orthogonal components of a vector. For example, u and v may represent the intensity of light from two different directions where the texel is rendered on the three-dimensional object. Specifically, a light source is first determined to be illuminating the three-dimensional object or model. The light source is defined as being positioned at a location relative to the texel being illuminated in the direction defined by illumination vector, $\vec{L}$. Illumination vector, $\vec{L}$, is typically a unit vector. Secondly, surface normal vector, $\vec{S}$. (which is the unit vector that is normal to the surface of the three-dimensional object where the texel is to be applied) is determined. The projection of illumination vector, $\vec{L}$, onto the plane defined by surface normal vector, $\vec{S}$, is determined. The projection is represented as two orthogonal vector components on the plane defined by surface normal vector, $\vec{S}$. The two orthogonal vector components are respectively associated with the scalar values, u and v.

Figure 3:
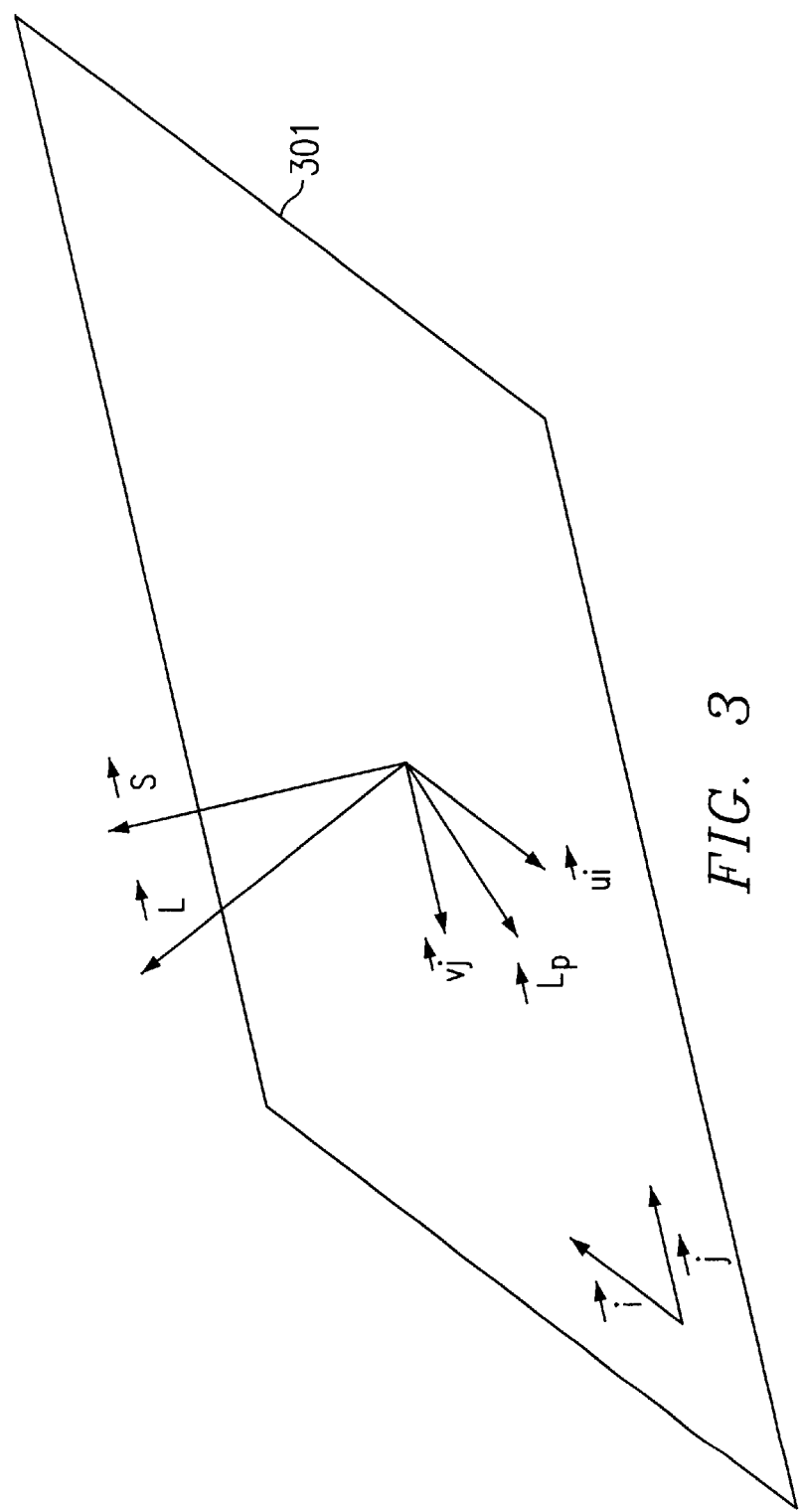
FIG. 3 depicts an exemplary plane associated with a texel, surface normal vector, and an illumination vector.

To aid the reader's understanding of the vector concepts, reference is now made to FIG. 3 which depicts exemplary plane 301 associated with a texel, surface normal vector, $\vec{S}$, and illumination vector, $\vec{L}$. As is well known in the art, plane 301 is defined by a position and surface normal vector, $\vec{S}$. The unit vectors $\vec{i}$ and $\vec{j}$ are mutually orthogonal on plane 301. Unit vectors $\vec{i}$ and $\vec{j}$ are also orthogonal to surface normal vector, $\vec{S}$, by definition. $\vec{L}_p$ is the projection of illumination vector, $\vec{L}$, onto plane 301. $\vec{L}_p$ is composed of components (u$\vec{i}$, v$\vec{j}$), where u and v are the scalar values of $\vec{L}_p$ in the $\vec{i}$ and $\vec{j}$ directions, respectively.

The coefficients of the texel representation equation, A–F, of the PTM texture may be determined by repeatedly sampling a surface. For example, a physical stone surface may be digitally photographed a number of times utilizing different illumination angles. The coefficients, A–F, may then be determined from the digital information utilizing a least square approximation. Singular value decomposition (SVD) may be utilized to perform this analysis. Further details regarding implementation of PTM algorithms are disclosed in U.S. patent application Ser. No. 09/528,700, entitled "APPARATUS FOR AND METHOD OF RENDERING 3D OBJECTS WITH PARAMETRIC TEXTURE MAPS."

In some embodiments of the present invention, the PTM function defines the brightness of a texel and the chromaticity is held constant, i.e., a single PTM function is utilized for all of the red, green, and blue (RGB) chromatic components or channels. However, it shall be appreciated that separate functions may be defined for RGB chromatic components or channels. The separate functions may be used to calculate gray-level intensities of the RGB channels. According to this approach, three separate functions are each evaluated according to u and v as determined by the same surface normal vector, $\vec{S}$, and the same illumination vector, $\vec{L}$. However, it is advantageous to cause the chromaticity to remain independent of u and v, because this approach reduces the computational complexity of the algorithm.

It shall be appreciated that PTM provides appreciable advantages over other texture mapping techniques. In particular, PTM does not require modeling the complex geometry structures. PTM textures are much more easily constructed from real world samples (e.g., photographs) than bump maps. Moreover, PTM textures provide greater realism than bump maps due to PTM's ability to model complex optical effects.

Although PTM provides a relatively high degree of realism, PTM does possess certain limitations. First, the digital information collected via photographic sampling is necessarily affected by the light utilized to illuminate the physical sample surface. For example, if a blue-tinted light was utilized, the PTM function will be affected by the blue tint. Second, the two-dimensional parameterization of the light (u, v) does not differentiate between front-facing light and back-facing light. Also, objects rendered using PTM textures do not possess ambient light properties.

In embodiments of the present invention, a one-dimensional light texture is preferably provided to modulate the PTM function to address the limitations discussed above. The one-dimensional light texture may be defined by a function of the dot product between illumination vector, $\vec{L}$, and surface normal vector, $\vec{S}$. The dot product, p, between illumination vector, $\vec{L}$, and surface normal vector, $\vec{S}$, is bounded by −1 and 1, because both $\vec{L}$ and $\vec{S}$ are unit vectors. If $\vec{L}$ and/or $\vec{S}$ are not defined as unit vectors for a particular application, the normalized dot product may be utilized which equals:

$$\vec{S} \cdot \vec{L} / |\vec{S}||\vec{L}|$$

Figure 4A:
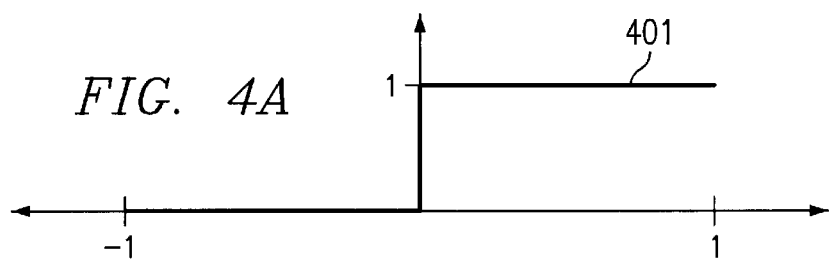
FIG. 4A depicts an exemplary mapping function according to an embodiment of the present invention.

FIG. 4A depicts exemplary function 401 which may be used to define the one-dimensional light texture for embodiments of the present invention. Function 401 is a step function of p, i.e., it equals zero for p<0 and it equals one for p≧0. By multiplying or modulating the PTM function by function 401 evaluated at p, it is possible to differentiate between front-facing and back-facing light. Specifically, when the illumination light defined by illumination vector, $\vec{L}$, is back-facing, the PTM function is multiplied by zero. Hence, no illumination is provided to the texel is this situation. However, when the illumination light is front-facing, the PTM function is multiplied by one. By modulating the PTM function in this manner, it is possible to differentiate between front-facing and back-facing illumination light.

Figure 4B:
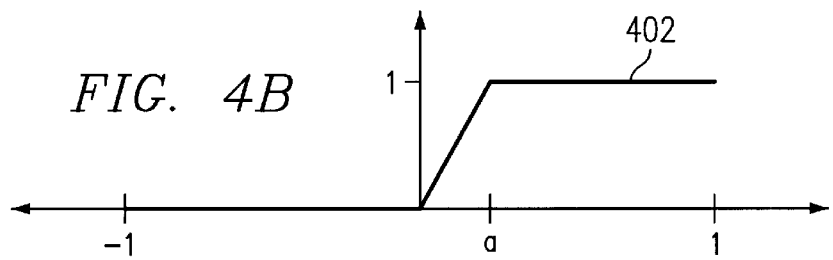
FIG. 4B depicts another exemplary mapping function according to an embodiment of the present invention.

FIG. 4B depicts another exemplary function 402 which may be used to define the one-dimensional light texture for embodiments of the present invention. As shown, function 402 equals zero for p<0. However, function 402 does not experience as abrupt a change as function 401. Instead, function 402 is a ramp function from p=0 to p=a. For p>a, function 402 equals one. Although function 402 utilizes a linear ramp between p=0 and p=a, other functions may be utilized. As examples, a polynomial function or an exponential function may be utilized to transition from the minimum and maximum values if desired. Utilizing suitable ramping functions, the transition from back-facing to front-facing illumination is provided in a relatively smooth manner. By modulating the PTM function in this manner, it is possible to model low-angle illumination phenomenon with a greater degree of realism.

Figure 4C:
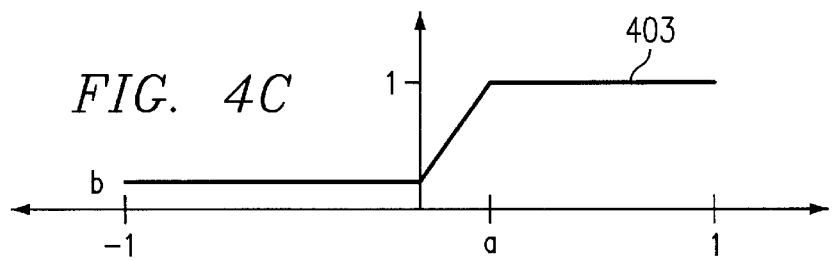
FIG. 4C depicts another exemplary mapping function according to an embodiment of the present invention.

FIG. 4C depicts yet another exemplary function 403 that may be used to define the one-dimensional light texture for embodiments of the present invention. Function 403 is similar to function 402. However, function 403 is equal to the minimum value, b>0, for p<0. The minimum value, b, represents an ambient light property. The ambient light property causes a certain amount of light to be associated with the texel even if the illumination light is back-facing.

In embodiments of the present invention, the synthesis process preferably utilizes a non-white light source. It shall be appreciated that the illumination light utilized by PTM is typically a white light. In other words, the illumination source associated with illumination vector, $\vec{L}$, is assumed to emit illumination possessing substantially equal intensities of red, green, and blue spectral components. However, embodiments of the present invention preferably define RGB illumination parameters. The RGB parameters define the relative intensity of the various color channels of the illumination light. The PTM function value for a particular color channel may be modulated by the respective RGB parameter. By modulating with the RGB parameters, the illumination light may be varied as desired. For example, if a red-tinted illumination source is desired, the red parameter may be weighted more heavily that the green and blue parameters. By utilizing RGB parameters, embodiments of the present invention may define synthesis illumination tinted according to any arbitrary spectral composition.

It shall be appreciated that modulation by evaluating functions 401, 402, and 403 does not encompass appreciable computational complexity. In particular, the operations may be performed by a few multiplication operations and a table look-up. Accordingly, embodiments of the present invention are capable of providing enhanced optical effects to PTM textures without appreciably affecting rendering efficiency.

Figure 5:
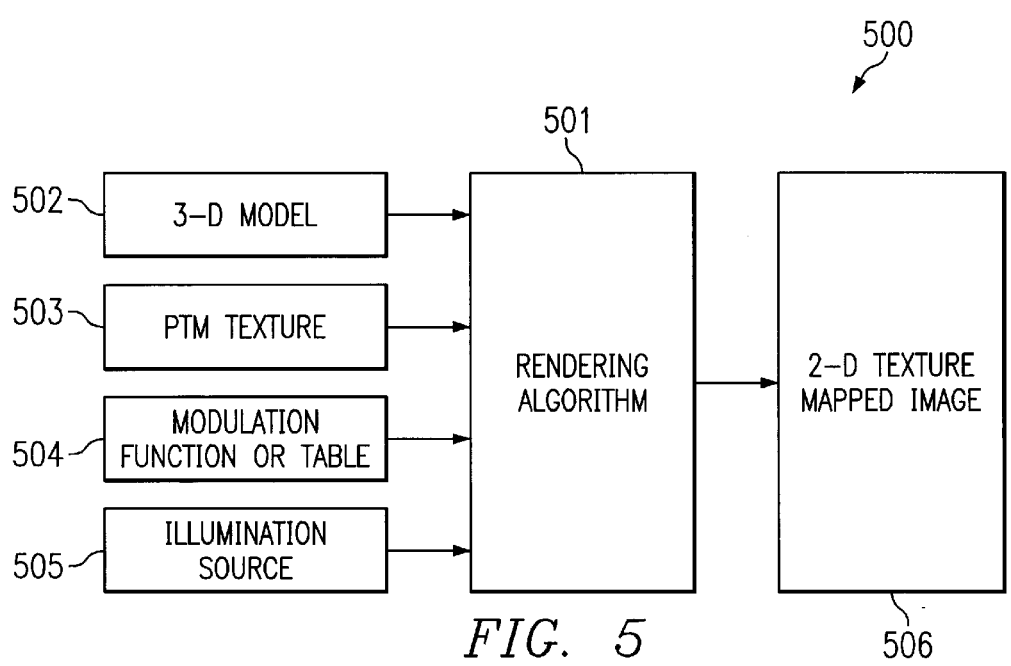
FIG. 5 depicts an exemplary block diagram of a texture rendering system according to embodiments of the present invention.

FIG. 5 depicts a block diagram of an exemplary system 500 adapted according to embodiments of the present invention. Exemplary system 500 comprises rendering algorithm 501. Rendering algorithm 501 utilizes three-dimensional model 502 as the basis for the wrapping functionality. For example and not by way of limitation, three-dimensional model 502 may contain vertexes information as previously described with respect to object 101 of FIG. 1A. Rendering algorithm 501 also utilizes PTM texture map 503, modulation function (or table) 504, and illumination source 505 to wrap the texels onto the surfaces of the three-dimensional object to produce two-dimensional texture map image 506. PTM texture map 503 may be implemented as a data structure stored in memory. Modulation function 504 may be implemented as a data structure (e.g., a class, a table, or an array) or logical instructions which map an illumination parameter to a modulation value. Illumination source 505 may be implemented as a data structure. Illumination source 505 may define vector components of the illumination. Illumination source 505 may also define RGB parameters to tint the illumination as desired.

Figure 6:
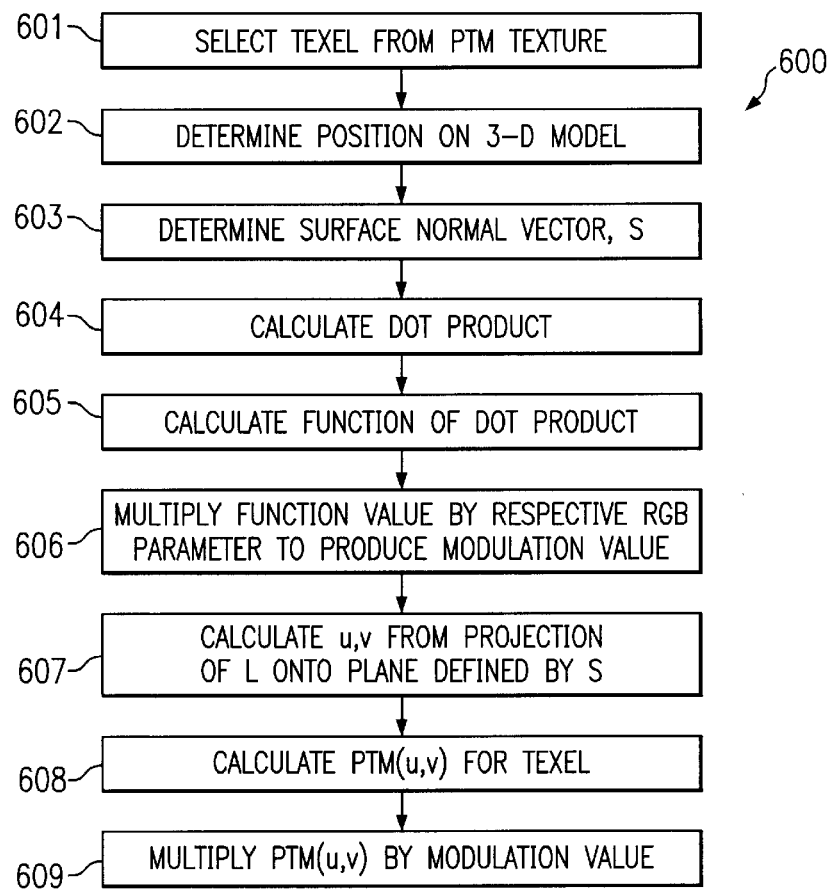
FIG. 6 depicts an exemplary flowchart according to embodiments of the present invention.

FIG. 6 depicts exemplary flowchart 600 according to embodiments of the present invention. Flowchart 600 comprises exemplary steps which may be performed by rendering algorithm 501 to generate texture mapped image 506. Flowchart 600 begins with step 601 where a texel is selected from a PTM texture 503. The position where the texel is to be placed on the three-dimensional model is determined in step 602 through conventional texture mapping techniques. Specifically, surface normal vector, $\vec{S}$, is determined in step 603. However, according to the present invention, the dot product between illumination vector, $\vec{L}$, defined by illumination source 505, and surface normal vector, $\vec{S}$, is calculated in step 604. In step 605, the function value (via function 401, 402, 403 or other suitable function) is determined by utilizing the value of the dot product. As previously noted, the function value allows differentiation between front-facing and back-facing light and allows perception of ambient light. In step 606, the function value is multiplied by the respective RGB parameter to produce the modulation value. For example, if the red component or channel of the texel is being rendered, the function value is multiplied by the red parameter. As previously noted, the RGB parameters allow the illumination light to be tinted as desired. In step 607, u and v are calculated from the projection of illumination vector, $\vec{L}$, onto the plane defined by surface normal vector, $\vec{S}$. In step 608, the value of PTM(u, v) is calculated. In step 609, the value of PTM(u, v) is multiplied by the modulation value (the result of step 606). Step 609 produces the modulated PTM value. The modulated PTM value is utilized to render a pixel on a computer graphics image.

When implemented via executable instructions, various elements of the present invention are, in essence, the code defining the operations of such various elements. The executable instructions or code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media may include any medium that may store or transfer information.

Figure 7:
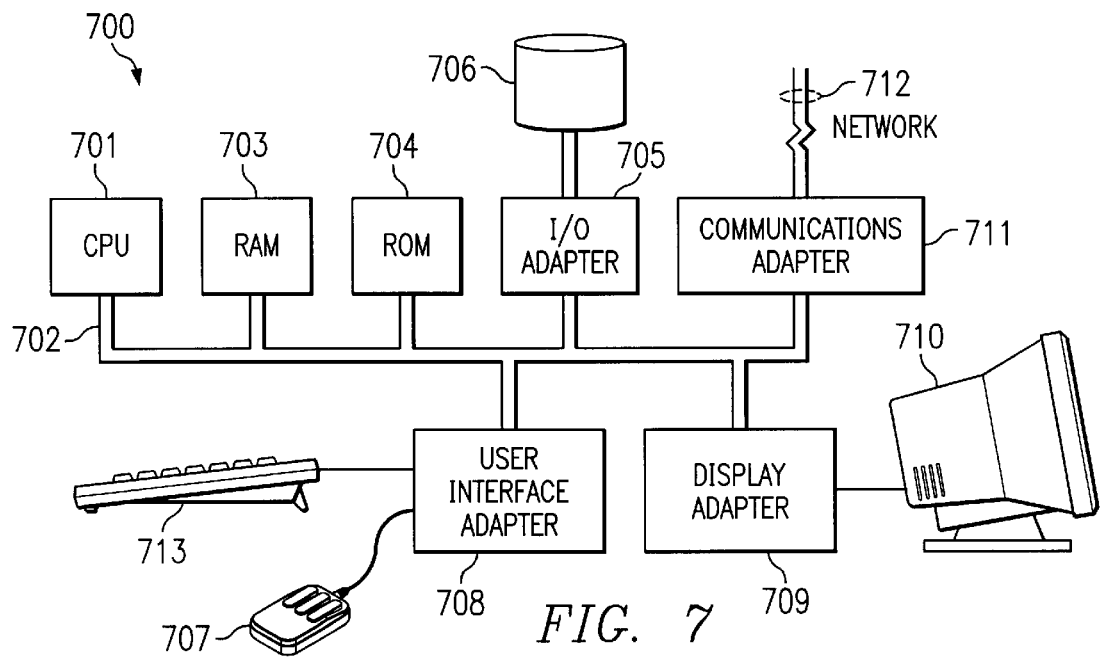
FIG. 7 depicts a block diagram of a computer system on which embodiments of the present invention may be implemented.

FIG. 7 illustrates exemplary computer system 700 adapted according to embodiments of the present invention. Central processing unit (CPU) 701 is coupled to system BUS 702. CPU 701 may be any general purpose CPU. Suitable processors, without limitation, include any processor from the Itanium family of processors or a PA-8500 processor available from Hewlett-Packard Company. However, the present invention is not restricted by the architecture of CPU 701 as long as CPU 701 supports the inventive operations as described herein. Computer system 700 includes BUS 702. Computer system 700 also includes random access memory (RAM) 703, which may be, for example, SRAM, DRAM, or SDRAM. Computer system 700 includes ROM 704 which may be PROM, EPROM, or EEPROM. RAM 703 and ROM 704 hold user and system data and programs as is well-known in the art.

Computer system 700 also includes input/output (I/O) adapter 705, communications adapter 711, user interface adapter 708, and display adapter 709. I/O adapter 705 connects to storage devices 706, such as one or more of hard drive, CD drive, floppy disk drive, tape drive, to computer system 700. Communications adapter 711 is adapted to couple computer system 700 to network 712, which may be one or more of telephone network, local (LAN) and/or wide-area (WAN) network, Ethernet network, and/or Internet network. User interface adapter 708 couples user input devices, such as keyboard 713 and pointing device 707, to computer system 700. Display adapter 709 is driven by CPU 701 to control the display on display device 710.

Although embodiments of the present invention have been described as being implemented in software instructions, it shall be appreciated that the present invention is not so limited. Embodiments of the present invention may be implemented on application specific integrated circuits (ASIC) or very large scale integrated (VLSI) circuits. In fact, persons of ordinary skill in the art may utilize any number of suitable structures capable of executing logical operations according to the embodiments of the present invention. Additionally, it shall be appreciated that the present invention is not limited to the architecture of computer system 700. Any suitable processor-based device may be utilized including, without limitation, personal data assistants (PDAs), computer game consoles, and multi-processor servers.

Embodiments of the present invention provide several advantages. First, embodiments of the present invention enable the use of PTM techniques to achieve an appreciable amount of realism to graphical images. Embodiments of the present invention enable PTM techniques to render graphical images by differentiating between back-facing and forward-facing light to achieve a greater degree of realism. Also, embodiments of the present invention enable a gradual visual transition between back-facing and front-facing lighting effects to achieve greater realism. Embodiments of the present invention enable ambient light effects to be rendered utilizing PTM techniques. Moreover, embodiments of the present invention enable the illumination light to be tinted according to any desired spectral composition.

What is claimed is:

1. A system for rendering a digital image, comprising:
    a texture map data structure representing a texture map of a plurality of texels, said texture map data structure comprising a plurality of coefficients to define a respective lighting function for each texel of said texture map;
    a modulation element for defining a range of modulation values corresponding to first input values, wherein said modulation values includes a non-zero minimum modulation value to define an ambient light level; and
    a rendering algorithm for applying said texture map to a surface, said rendering algorithm determining scalar quantities associated with orthogonal vectors on said surface, applying said scalar quantities to a respective lighting function of said texture map data structure to calculate a gray-level value, determining a dot product of a vector normal to said surface and an illumination vector, obtaining a respective modulation value from said modulation element using said dot product as a second input value, multiplying said respective gray-level value by said modulation value, and rendering a respective pixel using said multiplied gray-level value.

2. The system of claim 1 wherein said multiplied gray-level value defines a gray-level for a single chromatic channel.

3. The system of claim 1 wherein said multiplied gray-level value defines a gray-level for all chromatic channels.

4. The system of claim 1 wherein said modulation element defines a step function according to said minimum modulation value and a maximum modulation value.

5. The system of claim 1 wherein said modulation element defines a ramp between said minimum modulation value and a maximum modulation value.

6. The system of claim 1 wherein said modulation values are bounded by said minimum modulation value and one.

7. The system of claim 1 wherein said orthogonal vectors are orthogonal components of a projection of said illumination vector onto said surface.

8. The system of claim 1 wherein said respective lighting function for each texel is of the form $Au^2+Bv^2+Cuv+Du+Ev+F$, where u and v are said scalar quantities and A, B, C, D, E, and F are said plurality of coefficients.

9. The system of claim 1 further comprising:
    a plurality of chromatic channel parameters, wherein said rendering algorithm multiplies said gray-level value by one of said plurality of chromatic channel parameters before rendering a respective pixel.

10. The system of claim 1 wherein said modulation element is selected from the group consisting of a function, a table, and logical instructions.

11. A method comprising:
    retrieving a plurality of coefficients from a texture map data structure, wherein said plurality of coefficients defines a lighting equation for a texel of a texture map;
    determining scalar quantities associated with orthogonal vectors on a surface;
    applying said scalar quantities to said lighting equation to calculate a gray-level value;
    calculating a dot product between an illumination vector and a vector normal to said surface;
    determining a modulation value from said dot product according to a range of modulation values that includes a non-zero minimum modulation value that defines an ambient light level;
    multiplying said gray-level value by said modulation value; and
    rendering a pixel utilizing said multiplied gray-level value.

12. The method of claim 11 further comprising:
    multiplying said gray-level value by a chromatic parameter before said rendering.

13. The method of claim 11 wherein said calculating a dot product normalizes said dot product.

14. The method of claim 11 wherein said determining scalar quantities comprises:
   projecting said illumination vector onto said surface to define said orthogonal vectors on said surface.

15. The method of claim 14 wherein said scalar quantities are represented by u and v and said plurality of coefficients are represented by A, B, C, D, E, and F, and said lighting equation is defined by $Au^2+Bv^2+Cuv+Du+Ev+F$.

16. The method of claim 11 further comprising providing a ramped transition between modulation values associated with back-facing illumination and modulation values associated with front-facing illumination.

17. A system comprising:
   means for representing a texture map using a plurality of texels, wherein each texel defines a biquadratic lighting equation that is a function of two scalar quantities;
   means for defining a plurality of modulation values corresponding to front-facing and back-facing illumination, wherein said plurality of modulation values includes a minimum modulation value to define an ambient light level; and
   means for rendering said texture map on a surface, wherein said means for rendering is operable, for each texel of said means for representing mapped onto said surface, to project an illumination vector on said surface to determine said two scalar quantities, to provide said two scalar quantities to said biquadratic lighting equation to calculate a brightness level, to determine whether said illumination vector is front-facing or back-facing relative to said surface, to obtain a modulation value from said means for defining, to multiply said brightness level by said modulation level, and to render a pixel using said multiplied brightness level.

18. The system of claim 17 wherein said means for rendering is operable to determine whether said illumination vector is front-facing or back-facing by calculating a dot product between a surface normal vector and said illumination vector.

19. The system of claim 17 wherein said means for defining provides a ramp transition between said minimum modulation value and a maximum modulation value.

20. The system of claim 17 wherein said means for rendering multiplies said brightness level by a chromatic parameter before rendering said pixel.

* * * * *